US010735453B2

(12) United States Patent
Stevens, IV et al.

(10) Patent No.: US 10,735,453 B2
(45) Date of Patent: *Aug. 4, 2020

(54) NETWORK TRAFFIC FILTERING AND ROUTING FOR THREAT ANALYSIS

(71) Applicant: VERIZON PATENT AND LICENSING INC., Basking Ridge, NJ (US)

(72) Inventors: Eugene B. Stevens, IV, Lakewood, CO (US); Eric J. Stevens, Centennial, CO (US); Benjamin E. Kornmeier, Denver, CO (US); Joshua J. Hollander, Littleton, CO (US); Antonis Papadogiannakis, Crete (GR)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,731

(22) Filed: Mar. 1, 2019

(65) Prior Publication Data
US 2019/0312904 A1 Oct. 10, 2019

Related U.S. Application Data

(63) Continuation of application No. 15/483,957, filed on Apr. 10, 2017, now abandoned, which is a
(Continued)

(51) Int. Cl.
*H04L 29/06* (2006.01)
*H04L 12/813* (2013.01)
(Continued)

(52) U.S. Cl.
CPC .......... *H04L 63/1433* (2013.01); *H04L 45/70* (2013.01); *H04L 47/20* (2013.01);
(Continued)

(58) Field of Classification Search
CPC ..... H04L 63/1433; H04L 63/20; H04L 47/20; H04L 63/0227; H04L 67/10; H04L 45/70; H04L 69/329
See application file for complete search history.

(56) References Cited

U.S. PATENT DOCUMENTS 5,315,580 A 5/1994 Phaal
5,935,245 A 8/1999 Sherer
(Continued)

OTHER PUBLICATIONS

Application Aware Network Performance Monitoring Essentials; Network Instruments Techology Partner/Solution Brief; available at http://www.gigamon.com/PDF/TechnologySolutionBriefs/NetworkInstruments_Solution/Brief.pdf. 3 pages. Copyright 2012.
(Continued)

*Primary Examiner* — Abu S Sholeman

(57) ABSTRACT

Implementations disclosed herein provide a managed security service that distributes processing tasks among a number of network security modules working in parallel to process component portions of a replayed network traffic stream. If a network security module detects a potential security threat, the network security module may generate a delivery request specifying other information potentially useful in further investigation of the potential security threat. The delivery request is communicated to a plurality of other processing entities, such as the other network security modules, and any processing entity currently receiving the requested information may respond to the delivery request. Once a source of the requested information is determined, the requested information is routed to the origin of the request.

20 Claims, 8 Drawing Sheets

Related U.S. Application Data continuation of application No. 14/711,584, filed on May 13, 2015, now Pat. No. 9,654,445, which is a continuation-in-part of application No. 14/079,400, filed on Nov. 13, 2013, now Pat. No. 9,516,049.

(51) Int. Cl.
*H04L 12/721* (2013.01)
*H04L 29/08* (2006.01)

(52) U.S. Cl.
CPC .......... *H04L 63/0227* (2013.01); *H04L 63/20* (2013.01); *H04L 67/10* (2013.01); *H04L 69/329* (2013.01)

(56) References Cited

U.S. PATENT DOCUMENTS

| | | |
|---|---|---|
| 6,453,345 B2 | 9/2002 | Trcka |
| 6,735,688 B1 | 5/2004 | Upton et al. |
| 7,006,756 B1 | 2/2006 | Keesen et al. |
| 7,181,769 B1 | 2/2007 | Keanini et al. |
| 7,251,215 B1 | 7/2007 | Turner |
| 7,254,114 B1 | 8/2007 | Turner et al. |
| 7,307,949 B1 | 12/2007 | Washburn et al. |
| 7,379,857 B2 | 5/2008 | Piesco |
| 7,454,790 B2 | 11/2008 | Potok |
| 7,472,418 B1 | 12/2008 | McCorkendale et al. |
| 7,492,713 B1 | 2/2009 | Turner et al. |
| 7,519,990 B1* | 4/2009 | Xie ................. H04L 63/145 726/13 |
| 7,581,249 B2 | 8/2009 | Bussiere et al. |
| 7,587,485 B1 | 9/2009 | Chitnis et al. |
| 7,650,533 B1 | 1/2010 | Saxena et al. |
| 7,835,348 B2 | 11/2010 | Kasralikar |
| 7,877,807 B2 | 1/2011 | Shipp |
| 7,899,901 B1 | 3/2011 | Nijemanze et al. |
| 8,046,835 B2 | 10/2011 | Herz |
| 8,248,958 B1 | 8/2012 | Tulasi et al. |
| 8,260,716 B2 | 9/2012 | Hoffman et al. |
| 8,499,330 B1 | 7/2013 | Albisu et al. |
| 8,560,679 B2 | 10/2013 | Nijemanze et al. |
| 8,577,355 B1 | 11/2013 | Shaw |
| 8,621,636 B2 | 12/2013 | Bailey |
| 8,898,788 B1 | 11/2014 | Aziz et al. |
| 9,026,722 B2 | 5/2015 | Kamphenkel |
| 9,183,384 B1 | 11/2015 | Bruhmuller |
| 9,204,299 B2 | 12/2015 | McCann |
| 9,497,211 B2 | 11/2016 | Spatscheck |
| 2001/0039579 A1 | 11/2001 | Trcka et al. |
| 2002/0163913 A1 | 11/2002 | Oh |
| 2003/0074317 A1 | 4/2003 | Hofi |
| 2003/0145039 A1 | 7/2003 | Bonney et al. |
| 2004/0172557 A1 | 9/2004 | Nakae et al. |
| 2004/0264454 A1 | 12/2004 | Rajkumar et al. |
| 2005/0166041 A1 | 7/2005 | Brown |
| 2005/0193244 A1 | 9/2005 | Stager et al. |
| 2006/0143300 A1 | 6/2006 | See et al. |
| 2006/0161983 A1 | 7/2006 | Cothrell et al. |
| 2006/0259542 A1 | 11/2006 | Wu et al. |
| 2006/0265748 A1 | 11/2006 | Potok |
| 2007/0060169 A1 | 3/2007 | Johansson et al. |
| 2007/0074272 A1 | 3/2007 | Watanabe |
| 2007/0088922 A1 | 4/2007 | Passerini |
| 2007/0204346 A1 | 8/2007 | Meier |
| 2007/0289014 A1 | 12/2007 | Pyo et al. |
| 2008/0005782 A1 | 1/2008 | Aziz |
| 2008/0080540 A1 | 4/2008 | Karacali-Akyamac et al. |
| 2008/0127335 A1 | 5/2008 | Khan et al. |
| 2008/0163333 A1 | 7/2008 | Kasralikar |
| 2008/0172738 A1 | 7/2008 | Bates et al. |
| 2008/0196102 A1 | 8/2008 | Roesch |
| 2008/0260151 A1 | 10/2008 | Fluhrer et al. |
| 2009/0044024 A1 | 2/2009 | Oberheide et al. |
| 2009/0172818 A1 | 7/2009 | Sutherland et al. |
| 2009/0213861 A1 | 8/2009 | Benner et al. |
| 2009/0282125 A1 | 11/2009 | Jeide et al. |
| 2010/0122345 A1 | 5/2010 | Wu et al. |
| 2010/0180004 A1 | 7/2010 | Oliynyk et al. |
| 2010/0265915 A1 | 10/2010 | Sun et al. |
| 2010/0296395 A1 | 11/2010 | Fukuda et al. |
| 2011/0055916 A1 | 3/2011 | Ahn |
| 2011/0154497 A1 | 6/2011 | Bailey |
| 2011/0179479 A1 | 7/2011 | Tsai et al. |
| 2011/0246798 A1 | 10/2011 | Bilgin et al. |
| 2011/0306386 A1 | 12/2011 | Centoza et al. |
| 2011/0307956 A1 | 12/2011 | Yermakov et al. |
| 2012/0005754 A1 | 1/2012 | Lin et al. |
| 2012/0060209 A1 | 3/2012 | Leu |
| 2012/0159591 A1 | 6/2012 | Payne et al. |
| 2012/0166637 A1 | 6/2012 | White et al. |
| 2012/0291125 A1 | 11/2012 | Maria |
| 2013/0081137 A1 | 3/2013 | Geigel |
| 2013/0086615 A1 | 4/2013 | Williams et al. |
| 2013/0094355 A1 | 4/2013 | Nakash |
| 2013/0094515 A1 | 4/2013 | Gura et al. |
| 2013/0138875 A1 | 5/2013 | Kamphenkel et al. |
| 2013/0227689 A1 | 8/2013 | Pietrowicz et al. |
| 2013/0301607 A1 | 11/2013 | McCann et al. |
| 2014/0059678 A1 | 2/2014 | Parker |
| 2014/0130167 A1 | 5/2014 | Lee et al. |
| 2014/0153399 A1 | 6/2014 | Song |
| 2014/0223559 A1* | 8/2014 | Spatscheck ......... H04L 63/1458 726/22 |
| 2014/0325649 A1 | 10/2014 | Zhang |
| 2015/0007314 A1 | 1/2015 | Vaughan |
| 2015/0067816 A1 | 3/2015 | Rados et al. |
| 2015/0135301 A1 | 5/2015 | Davies et al. |
| 2015/0236819 A1 | 8/2015 | Zhovnirnovsky et al. |
| 2016/0277578 A1 | 9/2016 | Williams et al. |
| 2017/0048262 A1 | 2/2017 | Stevens et al. |

OTHER PUBLICATIONS

What is a Network Packet Broker? VSS; http://vsssmonitoring.com/home/network-packet-broker.asp, 4 pages. Copyright 2014. Retrieved Sep. 30, 2014.

Prevail Security Analytics—Disruptive Approach for Finding and Analyzing Advanced Attacks; http://www.arbornetworks.com/products/pravail/security/analytics, 3 pages. Copyright 2015. Retrieved May 13, 2015.

* cited by examiner

NETWORK TRAFFIC FILTERING AND ROUTING FOR THREAT ANALYSIS

CROSS-REFERENCE TO RELATED APPLICATIONS

This application is a continuation application of application Ser. No. 15/483,957, entitled "Network Traffic Filtering and Routing for Threat Analysis," and filed Apr. 10, 2017, which is a continuation application of application Ser. No. 14/711,584, entitled "Network Traffic Filtering and Routing for Threat Analysis" and filed May 13, 2015, now U.S. Pat. No. 9,654,445, issued May 16, 2017, which is a continuation-in-part application of application Ser. No. 14/079,400, entitled "Packet Capture and Network Traffic Replay" and filed Nov. 13, 2013, now U.S. Pat. No. 9,516,049, issued Dec. 6, 2016. Both of these applications are hereby incorporated by reference for all that they disclose or teach.

BACKGROUND

Technologies that collect, monitor, and/or analyze network traffic can be useful in searching for and identifying cyber security threats. However, the threat detection capability of network security systems can depend on the quality of captured data (e.g., network traffic) that is available for analysis. Some existing cyber-security technologies capture and process a network stream as a whole. However, a network stream can include vast quantities of data, and much of this data is not essential to successful detection and analysis of cyber threats. Sophisticated filtering schemes utilize a large amount of processing power and are generally cost-prohibitive to implement.

SUMMARY

Implementations described and claimed herein address the foregoing by providing communicatively coupled processing modules that perform threat analysis on component data streams of network traffic of an enterprise network. According to one implementation, a method for threat detection entails receiving, at a first processing module, a subset of a network traffic stream and identifying a potential security threat in the received subset. A delivery request is generated and transmitted to a plurality of other processing modules that are simultaneously receiving and processing data of the network traffic stream to request a portion of the network traffic stream including information for investigating the potential security threat that is not currently received by the first processing module. Responsive to communication of the delivery request, the requested portion of the replayed network stream is routed to the first processing module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

Figure 8:
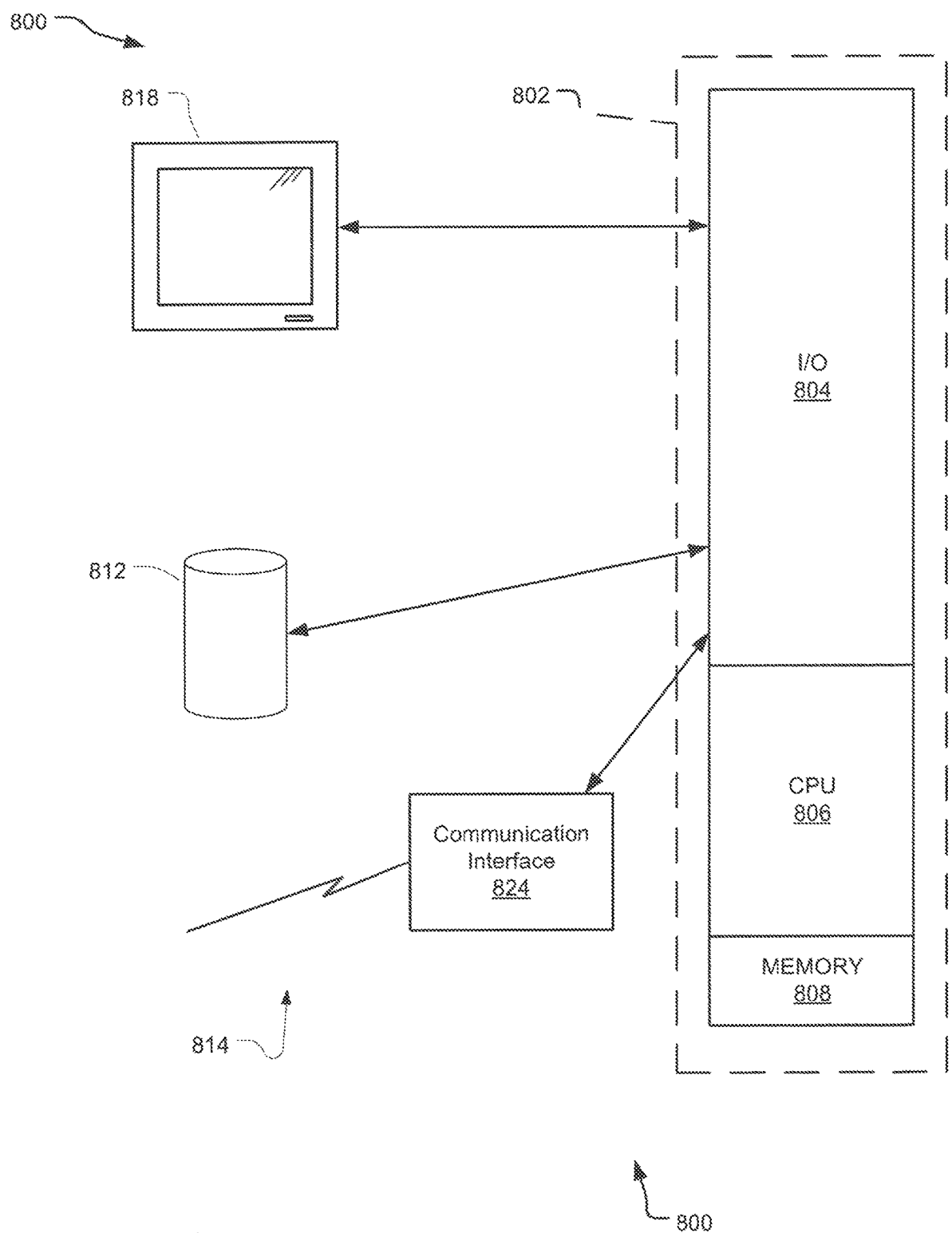

FIG. 8 discloses a block diagram of a computer system suitable for implementing one or more aspects of a security system that provides for network traffic replay outside of an enterprise network.

DETAILED DESCRIPTION

Figure 1:
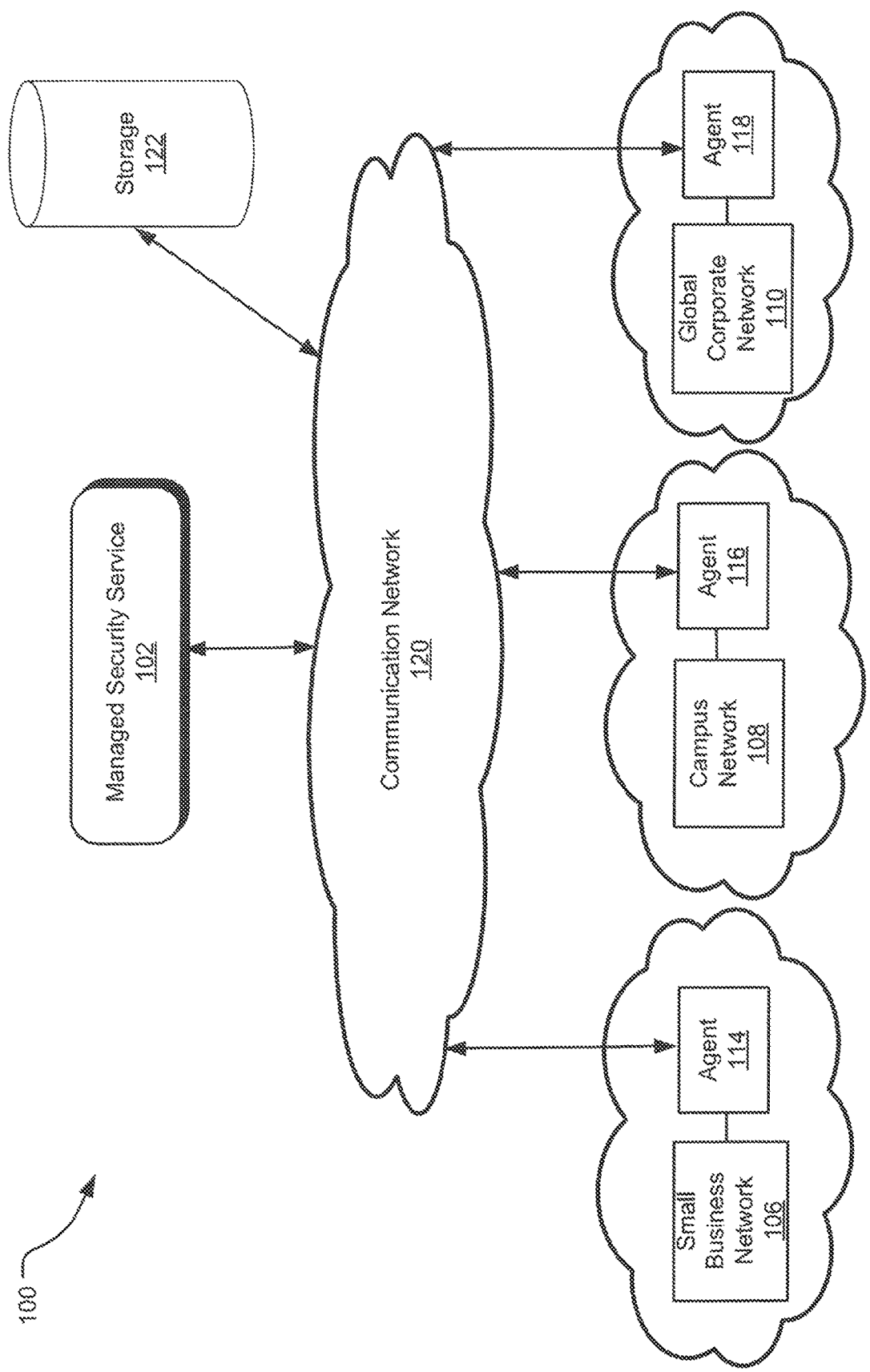
FIG. 1 illustrates an example network security system that replays traffic to provide threat analysis.

FIG. 1 illustrates an example security system 100 that replays network traffic to provide threat analysis. The network security system 100 includes a number of different enterprise networks 106, 108, and 110 coupled to a managed security service 102 across a communication network 120. The term "enterprise network" is used herein to refer to a network built by an enterprise to interconnect one or more enterprise sites and devices in order to share technology resources stored in one or more different physical locations. The sites and devices within the enterprise network are controlled by the security policies of the enterprise. An enterprise network can be a private or public network, and may include data hosted by one or more different servers. "Network traffic" refers to, for example, data traveling into, out of, or within an enterprise network.

The security system 100 includes a number of example enterprise networks including a small business network 106, a campus network 108, and a global corporate network 110. Other implementations of the disclosed technology include a plurality of other types of enterprise networks similar to or different from those shown in FIG. 1.

The small business network 106 includes a plurality of devices (e.g., desktop computers, laptop computer, tablets, mobile phones, etc.) with shared access to sensitive data such as customer contact information, sales records, inventory, etc. The computers may be located in the same facility (e.g., a store) or distributed across multiple facilities.

The example global corporate network 110 differs from the small business network 106 in that it has multiple branches around the world that exchange information over the same enterprise network. In one implementation, the example global network 110 shares information between the branches using a Virtual Private Network (VPN), which allows employees in different offices and/or other remote locations to access corporate resources (e.g., resources of a head office) in a secure and efficient manner.

The example campus network 108 connects students, faculty, and campus staff to shared data. In one implementation, the students, faculty, and staff connect to the campus network 108 by logging into a personal account with a username and password.

Each of the example enterprise networks 106, 108, and 110 has at least one local network agent (e.g., network agents 114, 116 and 118), which may be firmware and/or software residing within devices of each associated enterprise network, such as one or more computers or network appliances (e.g., mobile phones, tablets etc.). Each of the network agents 114, 116, and 118 are communicatively coupled, such as through the communication network 120 (e.g., the internet), to the managed security service 102. It should be understood that the above-described features of the small business network 106, campus network 108, and global corporate network 110 are exemplary features that in no way limit the scope of the term "enterprise network."

The network agents 114, 116, and 118 each selectively monitor local network traffic and replay the network traffic outside of the enterprise network (e.g., into the communication network 120). As used herein, the phrase "outside of the enterprise network" refers to a location outside of the security net of the controlling enterprise. "Replay" of network traffic entails intercepting network traffic destined for a target within or outside of the enterprise network; copying the intercepted network traffic; and transmitting the copied network traffic to a destination other than the target destination. The original, intercepted network traffic arrives at the target destination substantially unaffected by the replay.

The network agents 114, 116, and 118 each operate according to policies that control the amount and type of network traffic that is replayed into the communication network 120 from each of the enterprise networks. For example, various policies may govern which network traffic is selected and how the selected network traffic is processed during replay. The policies of one network agent (e.g., the network agent 114) may be the same or different from the policies of another network agent (e.g., the network agent 116). The policies of each of the network agents can be set by a controlling entity of the associated enterprise network or by a controlling entity associated with the managed security service 102. For example, policies may be specified by a system administrator or software parameters that are pre-selected or adaptively changed.

The security system 100 allows for a large or potentially infinite amount of data to be stored in storage 122 communicatively coupled to the communication network 120. Therefore, data storage constraints of the security system 100 may be considerably less burdensome than those constraints imposed when network traffic data is stored on hardware internal to a single enterprise network. In one implementation, the quantity of network traffic replayed into the communication network 120 by each of the network agents 114, 116, and 118 depends on the terms of a subscription plan between the managed security service 102 and each of the associated enterprise networks. For example, the global corporate network 110 may subscribe to a security service that provides for replay of a greater quantity of network traffic than a quantity of network traffic that is replayed from the small business network 106.

In one implementation, the replay of network traffic into the communication network 120 is performed in real-time. As used herein, "real-time" replay of network traffic entails transmission of select data (e.g., a copy of a subset of all data received) at substantially the same rate as the select data is received. In one implementation, "real-time" replay entails an average of one or more individual transmissions per second. A single transmission may transmit a single data packet or multiple data packets. In one implementation, multiple data packets are bundled together and transmitted in real-time. For example, 10 or more packets may be bundled together, and one or more bundles may be transmitted outside of the enterprise network every second. In one such implementation, the delay time between receipt of a packet by a network agent (e.g., the network agent 114) and transmission of the copied, prepared packet into the communication network 120 is less than one second. In another implementation, this delay time between packet receipt and packet transmission is approximately one-tenth of a second.

In still another implementation, one or more of the network agents 114, 116, and 118 transmit the network traffic on periodic basis. For example, a network agent may transmit one or more data packets or data packet bundles into the communication network 120 every few minutes, every few hours, once per day, or manually at the option of a system administrator. In yet another implementation, a network agent is tasked with capturing data corresponding to a predetermined time period of interest. The network agent begins capturing relevant data of the time period and postpones replay of the captured data until all relevant data is captured.

In one implementation, the network agents 114, 116, and 118 replay the network traffic into the communication network 120 in-line with normal traffic flow. In an inline replay system, data processing operations may operate on original data rather than on a copy of the data. The original data can be held by the processing operations until such operations have fully executed. Consequently, problems during pre-transmission processing and/or replay (e.g., crashes) may have side effects on software of the enterprise network, such as shutting down network access. For example, systems that use proxies to send and receive out-of-network requests can disrupt normal network operations in a failure scenario. Thus, there are some advantages to a passive replay system, described below.

In another implementation, the network agents 114, 116, and 118 replay the network traffic into the communication network 120 passively. In a passive replay system, the network agents make a copy of data traffic prior to pre-transmission processing and replay. Thus, one advantage to a passive replay system is that data processing issues do not affect the originating network traffic or software of the enterprise network. Consequently, passive replay systems do not generally disrupt normal network traffic flow.

The managed security service 102 unwraps the replayed network traffic, stores a copy of the replayed network traffic (e.g., in a storage location 122), and performs additional processing on the replayed network traffic to search for and identify security threats. In one implementation, a copy of raw network traffic from an enterprise network is stored in the communication network 120. For example, the raw network traffic of the global corporate network 110 may be maintained in a storage location 122 outside the global corporate network from the time that the global corporate network 110 first enlists the services of the managed security service 102 until the time that the global corporate network 110 cancels the services of the managed security service 102. The data preserved in the storage location 122 may include full or partial raw data. Metadata may also be preserved, either alone, or in addition to associated raw data. In at least one implementation, data is replayed into the communication network 120, but no data is preserved in the communication network 120. Different classifications (i.e., types) of network traffic (e.g., domain name system (DNS) traffic, HTTP traffic, streaming media traffic, etc.) may be preserved in the communication network 120 for different durations of time.

Preserving raw traffic data in the communication network 120 may allow for retrospective threat analysis dating back weeks, months, or even years to the time of any event captured in the raw traffic data. Therefore, raw traffic data stored on the communication network 120 can be retrospectively searched for threat signatures that were not known about and/or not actively looked for in the days immediately following an event of interest.

The replayed network traffic from each enterprise network may have a high degree of data integrity. Data integrity refers to a quantity and quality of data that allows for an accurate representation of an enterprise network. The security system 100 allows for a high degree of data integrity in the replayed network traffic because storage space within the communication network 120 is very large (e.g., potentially infinite). As a consequence of this enhanced data integrity, the security system 100 can replay network traffic that includes some traffic types (e.g., media traffic, http traffic, etc.) that are routinely discarded in other security systems where data is stored and analyzed locally (e.g., internal to a local enterprise network). Additionally, data integrity of the security system 100 is enhanced by the ability of the security system 100 to dynamically adjust policies governing the types and quantities of network traffic replayed. These dynamic policy adjustments are discussed in greater detail below.

Figure 2:
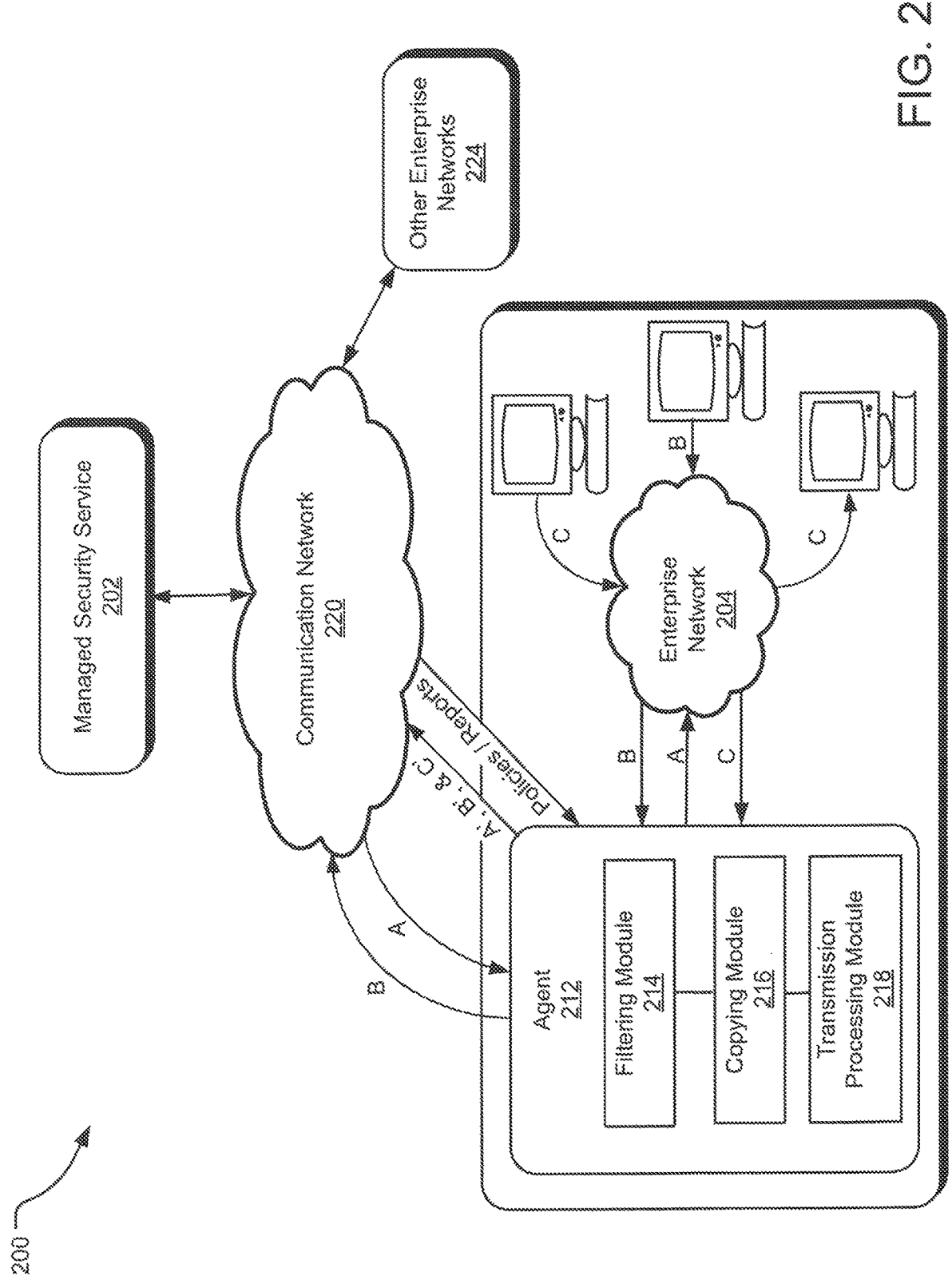
FIG. 2 illustrates an example security system including a network agent that processes and replays network traffic outside of an enterprise network.

FIG. 2 illustrates an example security system 200 including a network agent 212 that processes and replays network traffic of an enterprise network 204 to an entity (e.g., a managed security service 202) outside of the enterprise network 204. The enterprise network 204 includes a plurality of processing devices (e.g., computers) communicatively coupled to share data with one another. The network agent 212 resides locally within the enterprise network 204 (e.g., at a point of egress) and has access to network data packets sent to and/or from various communications devices within the enterprise network 204.

In one implementation, the network agent 212 is software loaded in memory of a computer connected to the enterprise network 204 by way of a wired or wireless network link on a carrier signal (e.g., Ethernet, 3G wires, 4G wireless, LTE, etc.). In another implementation, the network agent 212 is loaded into memory of a mobile device, such as a tablet or cellular phone. Other implementations may also be employed.

The network agent 212 intercepts network traffic including incoming network traffic (as indicated by a transmission line "A"), outgoing network traffic (as indicated by a transmission line "B"), and traffic transmitted between various locations within the enterprise network 204 (as indicated by a transmission line "C"). The network agent 212 utilizes various processing modules (e.g., a filtering module 214, a copying module 216, and a transmission processing module 218) to prepare a copy of the intercepted network traffic for transport out of the enterprise network. The prepared copy of the network traffic is then transmitted outside of the enterprise network (as indicated by another transmission "A', B', & C'"). The replayed network traffic is saved outside of the enterprise network 204 in a storage location accessible by the managed security service 202.

To prepare the network traffic for replay, the filtering module 214 filters (e.g., discards) some types of real-time traffic while selecting other types of real-time traffic for transmission. For example, the filtering module 214 may filter out some or all types of traffic with a low security profile such as streaming media and voice over IP (VoIP).

The filtering module 214 provides the filtered network traffic to the copying module 216, and the copying module 216 makes a copy of the filtered network traffic. This copy is provided to the transmission processing module 218, which processes the filtered, copied network traffic to prepare it for transmission into the communication network 220. In at least one implementation, the copying module 216 copies the network traffic after it is processed by the transmission processing module 218.

Both the filtering module 214 and the transmission processing module 218 operate according to a number of policies (e.g., rules for filtering and processing). These policies can be specified by either the managed security service 202 or the enterprise network 204.

In one implementation, the enterprise network 204 subscribes to a security service package provided by the managed security service 202. The security service package includes a number of pre-set policies that the network agent 212 implements in replaying network traffic. In this or another implementation, the enterprise network 204 customizes the security service package by selecting one or more additional policies for implementation. The pre-set or customized policies implemented by the network agent 212 can be dynamically altered at a later point in time, such as at the option of the enterprise network 204 or the managed security service 202.

Some data-selection policies may specify data types and quantities of network traffic for replay. For example, a policy set by the managed security service 202 may set a cap on the total bandwidth of network traffic that can be replayed by the network agent 212 outside of the enterprise network 204. Another example policy instructs the network agent 212 to discard network traffic relating to media streaming (e.g., Youtube™ videos, internet radio streams, etc.) These and other additional data-selection policies can be specified by one or both of the managed security service 202 or the enterprise network 204.

Still other data-selection policies prioritize different types of network traffic for replay into the communication network 220. For example, the enterprise network 204 may specify a data-selection policy that prioritizes domain name system (DNS) traffic over streaming media traffic. If this policy is implemented, the network agent 212 replays both DNS traffic and streaming media traffic into the communication network 220 so long as the total quantity of data replayed does not exceed a data cap policy set by the managed security service 202. When network traffic increases to the point that the amount of selected network traffic exceeds the data cap, the network agent 212 begins to discard or truncate streaming media traffic while continuing to replay DNS traffic. Another example data prioritization policy prioritizes HTTP traffic over Non-HTTP traffic. Yet another example data prioritization policy prioritizes "behavioral anomaly traffic" over "normal traffic."

The transmission processing module 218 processes the filtered (i.e., selected) and copied network traffic to prepare it for transmission outside of the enterprise network. This pre-transmission processing is performed according to a number of transmission preparation policies. Like the data-selection policies, the transmission preparation policies can be specified by controlling entities (e.g., system administrators) of the enterprise network 204 and/or the managed security service 202.

One example transmission preparation policy provides instructions for collecting and assembling metadata for replay into the communication network 220. Metadata can be used to describe all network connections and thus can be used to enhance pre-transmission processing operations and supply additional information useful in subsequent, post-transmission processing and analysis performed by the managed security service 202. In one implementation, metadata is replayed into the communication network 220 with corresponding network traffic data. In another implementation, metadata is replayed into the communication network 220 without corresponding network traffic data. For example, when avoiding transfer of a streaming media session, metadata relating to the streaming media session may still be transferred, such as the computers and servers involved in the transfer and the duration and size of the transfers. Metadata may be data that is included with the original network traffic or data that is created by the transmission processing module 218 based on the original network traffic.

Another example transmission preparation policy includes instructions for compressing data and managing data compression, such as by building replay traffic data in small, compression-friendly chunks in order to maximize gains. Still other example transmission preparation policies include policies for stripping noise, de-duplicating the traffic data, and encrypting the traffic data. In at least one implementation, data is replayed into the communication network 220 unencrypted.

The network agent 212 transforms the processed network traffic into a form suitable for transport outside of the enterprise network 204 and then sends the processed network traffic 212 into the communication network 220 for further processing (e.g., unwrapping, analysis) by the managed security service 202.

Within the communication network 220, the managed security service 202 unwraps the replayed network traffic, stores a copy of the raw traffic, and also processes the replayed network traffic to search for and identify security threats. The managed security service 202 periodically reports back to the network agent 212 with results and other information relating to the processing of the replayed network traffic. The managed security service 202 may send reports to the network agent 212 at regular time intervals or upon request of the enterprise network 204. Information reported back to the network agent 212 may be customized for the network agent 212 based on the policies of the network agent 212, which may be the same or different from policies of other network agents in the system 200 (e.g., network agents of other enterprise networks 224).

Security intelligence of the managed security service 202 is continuously gathered from ongoing analysis of replayed network traffic from a plurality of enterprise networks (e.g., the enterprise network 204 and other enterprise networks 224). The security intelligence collectively gained from the plurality of enterprise networks is referred to herein as "collective network intelligence." As additional threat signatures or cyber attack strategies are identified across each of the enterprise networks in the system 200, the collective network intelligence evolves. Because the managed security service 202 can, at any time, recommend or implement policies based on newly-acquired collective network intelligence, policies of the network agent 212 can be adaptively improved.

In one implementation, existing policies of the network agent 212 are dynamically altered by the managed security service 202 based on analysis of replayed traffic data from other enterprise networks 224. For example, an analysis of replayed traffic data from another enterprise network may lead to identification of one or more suspicious actions taken by a hacker prior to a security breach of the other enterprise network. Based on the identified suspicious actions, the managed security service 202 alters policies of the network agent 212 for data selection and/or pre-transmission processing. The altered policies help to ensure that the same suspicious actions, if repeated on the enterprise network 204, do not evade detection of the managed security system 202.

In the same or another implementation, policies are recommended to the network agent 212 by the managed security service 202 based on analysis of replayed traffic data from one or more other enterprise networks 224. For example, the managed security system 202 may detect a threat signature in type "A" network traffic that is observed on another one of the other enterprise networks 224. Thereafter, the managed security service 202 may recommend that the network agent 212 alter an existing data-selection priority policy to ensure that type "A" traffic of the enterprise network 204 is captured in the future.

This type of dynamic policy-alteration and/or intelligent policy recommendation may be especially useful in the context of different security plans subscribed to by various enterprise networks. For example, the enterprise network 204 may be a small business network that subscribes to a low-cost security package allotted less storage capacity than another high-end security package subscribed to by a multinational corporation. The low-cost security package of the small business may routinely discard some or all type 'A' network traffic. However, after detecting suspicious activity in type 'A' network traffic on the network of the multinational corporation, the managed security service 202 can recommend that the network agent 212 adopt a selection policy that increases the priority of capturing type 'A' network traffic. Thus, it becomes more likely that the managed security service 202 may detect suspicious activity that occurs in type 'A' network traffic on the enterprise network 204.

The network agent 212 may be capable of taking one or more remediative actions in response to an alert or policy recommendation from the managed security service 202. In one implementation, the network agent 212 can elect to take different remediative actions based on a severity of an identified threat. For example, the network agent 212 or the managed security service 202 may classify threats as "low-level," "medium-level," and "high-level." Depending on the level of the identified threat, the network agent 212 may take a different remediative action.

In one implementation, the managed security service 202 alerts the network agent 212 of a low-level threat and the network agent 212 requests that a controlling entity of the enterprise network 204 authorize implementation of a new policy. In another implementation, the managed security service 202 alerts the network agent 212 of a medium-level threat and the network agent 212 automatically implements one or more new policies without requesting authorization. In yet another implementation, the managed security service 202 alerts the network agent 212 of a high-level threat and the network agent 212 automatically resets a transmission control protocol (TCP) or quarantines one or more devices on the enterprise network 204.

In yet another implementation, the network agent 212 is integrated with on-premise firewalls and can instruct the on-premise firewalls to enforce policy. For example, the managed security service 202 may issue a TCP reset and communicate with the network agent 212 an instruction to disallow a certain type of traffic through the on-premise firewalls. The network agent 212 can then relay this instruction to the on-premise firewalls via an API call.

In still yet another implementation, the network agent 212 is integrated with on-premise advanced malware solutions to trigger specialized behavior of the malware solutions. For example, the network agent 212 may send a suspicious file to a network security appliance for further analysis.

Figure 3:
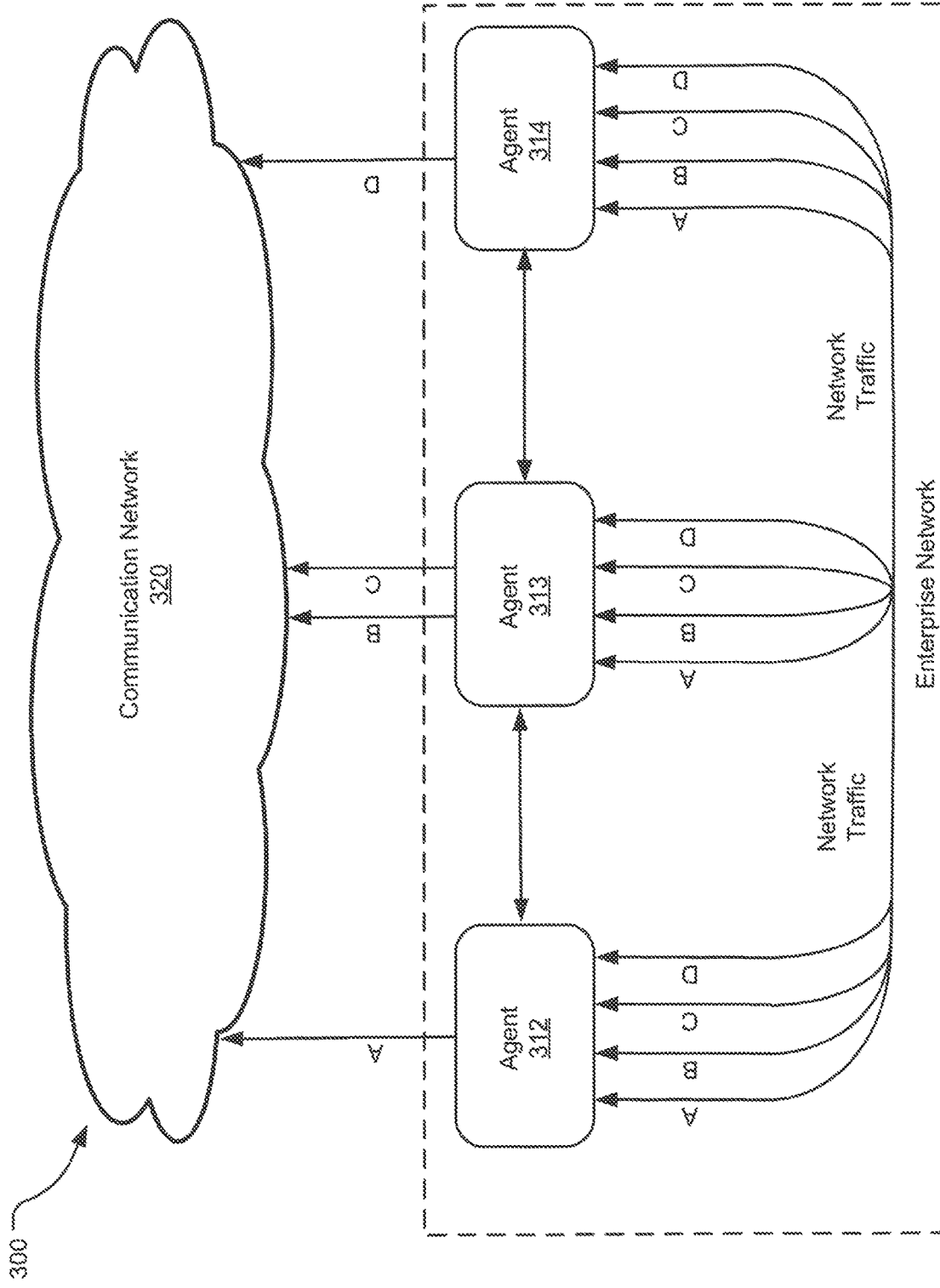
FIG. 3 illustrates another example security system including multiple network agents working in concert to replay network traffic of an enterprise network outside of the enterprise network.

FIG. 3 illustrates another example security system 300 including an enterprise network 304 and multiple network agents 312, 313, and 314 working together to replay network traffic outside of the enterprise network 304. Each of the network agents 312, 313, and 314 reside locally, at a point of egress, on the enterprise network 304. In one implementation, each of the network agents 312, 313, and 314 are located at different physical facilities that share data over the enterprise network 304.

The network agents 312, 313, and 314 each have access to network data packets sent to and from various communications devices on the enterprise network 304. Each of the network agents 312, 313, and 314 may have a filtering module, copying module, and a transmission processing module. These modules may perform the same or similar functions to those functions described with respect to FIG. 2.

The network agents 312, 313, and 314 communicate back and forth to coordinate policy implementation. In particular, the network agents 312, 313, and 314 can communicate to divide up one or more transmission processing and replay tasks. For example, one replay task illustrated by FIG. 3 entails execution of a policy that instructs the network agents 312, 313, and 314 to replay all network traffic of types A, B, C, and D into the communication network 320. The network agents 312, 313, and 314 communicate to divide up transmission processing and replay tasks among themselves. In FIG. 3, the network agent 312 replays network traffic of Type A; the network agent 313 replays network traffic of Type B and C; and the network agent 314 replays network traffic of type D. Each agent filters or ignores network traffic that is designated for replay by another one of the network agents. Inter-agent communication may be accomplished by way of dynamic peer-to-peer communication through a proprietary protocol and/or by way of policy, such as one or more customer-specified policies.

Figure 4:
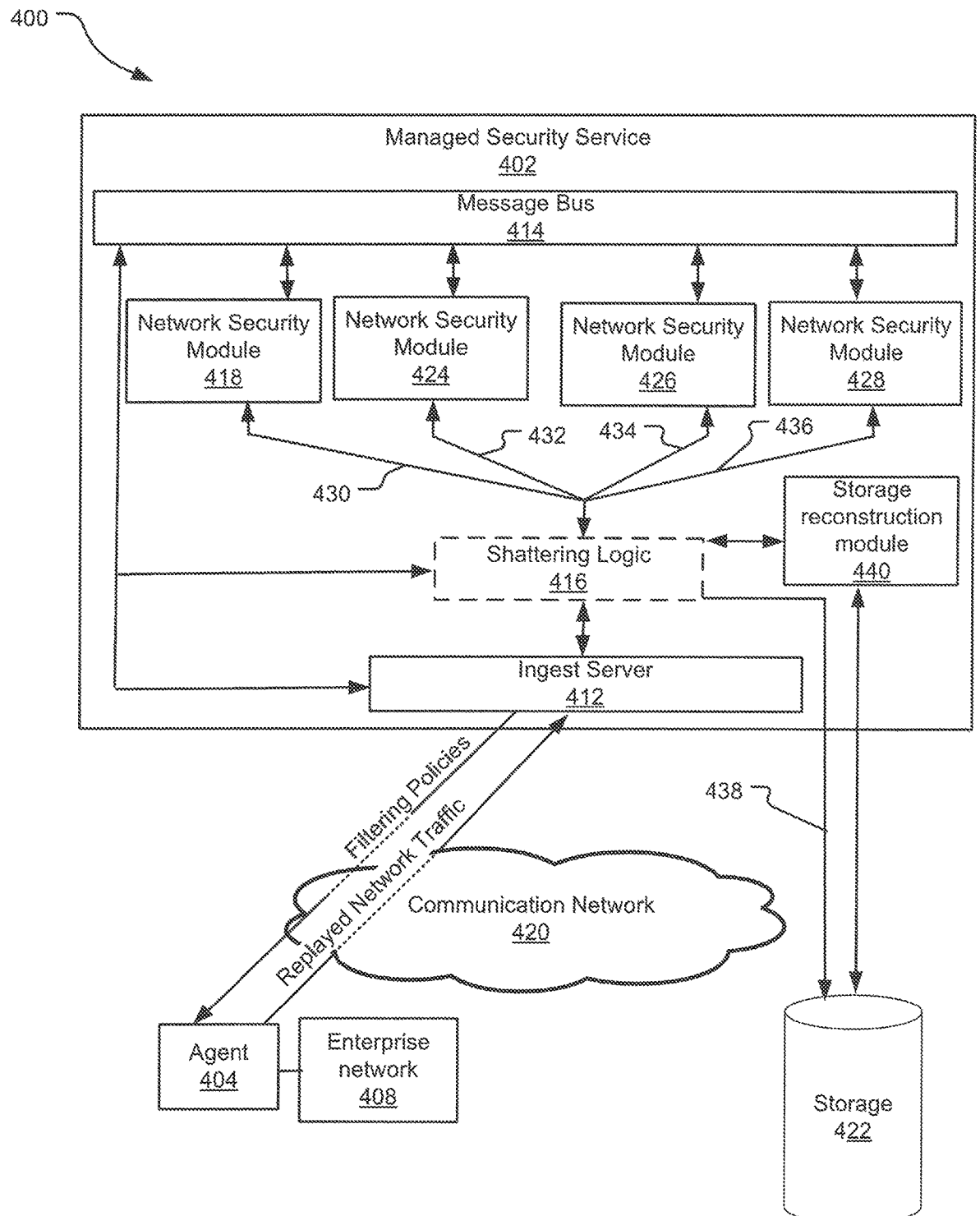
FIG. 4 illustrates an example network security system for detecting and analyzing security threats.

FIG. 4 illustrates another example network security system 400 for detecting and analyzing security threats. The network security system 400 includes a managed security service 402 that receives replayed network traffic from a number of different agents (e.g., a network agent 404) communicatively coupled to a respective enterprise network (e.g., the enterprise network 408) through a communication network 420.

Prior to replaying network traffic outside of the enterprise network 408, the network agent 404 filters the network traffic according to a set of filtering polices. Filtering policies are saved in a location readily accessible to the network agent 404, such as a non-volatile memory location within the enterprise network 408. In one implementation, the filtering policies of the network agent 404 are managed and dynamically controlled by an entity external to the enterprise network 408. For example, filtering policies of the network agent 404 may be managed by an ingest server 412 of the managed security service 402, or by another processing entity of the managed security service 402.

In one implementation, the ingest server 412 is a distributed server that ingests data of the network traffic stream using a number of separate physical devices operating in parallel. For example, the network agent 404 may split the network traffic stream into two or more component streams directed to different ingest servers of the managed security service. By running multiple ingest servers in parallel in a cloud-based environment, the managed security service 402 can receive and store vast amounts of information.

The ingest server 412 uses shattering logic 416 to "shatter" ingested traffic and form a number of component streams (e.g., "component streams" 430, 432, 434, 436, and 438). As used herein, "shattering" refers to splitting an input data stream into two or more component data streams including all or a portion of the input data stream. In various implementations, shattering may entail filtering and/or duplication of data. In addition, shattering the ingested traffic, the shattering logic 416 can also be employed to perform destination routing of the component streams to various processing modules and storage locations.

The component streams 430, 432, 434, and 436 are each directed to a corresponding network security module (e.g., network security modules 418, 424, 426, and 428, respectively), while the component stream 438 is directed to permanent storage 422 that is further coupled to a storage reconstruction module 440.

The shattering logic 416 is accessible to any of the ingest server 412, the network security modules 418, 424, 426, and 428, and the storage reconstruction module 440. As explained in further detail below (e.g., with respect to FIGS. 5-6), the shattering logic 416 generally facilitates fulfillment of delivery requests to various systems and processing modules, such as requests for real-time data and/or stored (non real-time) data. In one implementation, the storage reconstruction module 440 accesses the shattering logic 416 to provide on-demand reassembly of raw data from the permanent storage 422.

Content of the component streams 430, 432, 434, and 436 is determined based on specific data requests from each of the corresponding number of network security modules 418, 424, 426, and 428. In general, the network security modules 418, 424, 426, and 428 each operate to parse and analyze an associated one of the component streams 430, 432, 434, or 436 to search for and analyze potential security threats.

In different implementations, content of each of the component streams 430, 432, 434, and 436 varies based on what is requested and used by each of the corresponding network security modules 418, 424, 426, and 428. For example, the various component streams may be identical, partially overlapping, completely distinct (non-overlapping), or any combination thereof depending on the function and purpose of each associated network security module. The quantity, purpose, and functionality of the network security modules 418, 424, 426, and 428 varies in different implementations depending on a number of considerations such as, for example, specific threats identified in the replayed network traffic stream, the type of enterprise network 408, etc.

In one implementation, two or more of the network security modules 418, 424, 426, and 428 operate in parallel to process different subsets of the replayed network traffic stream. For example, some of the network security modules may be intrusion detection modules that each receive a subset of TCP traffic and/or other traffic protocols (e.g., UDP traffic) included in the replayed network traffic stream. Multiple intrusion detection modules process the received subsets in parallel with one another.

In another implementation, two or more of the network security modules 418, 424, 426, and 428 operate in parallel to process a same subset of the ingested network traffic stream. For example, some of the network security modules 418, 424, 426, and 428 are deep packet inspection modules that receive a full copy of the UDP traffic included in the replayed network traffic stream. In yet another implementation, the network security modules 418, 424, 426, and 428 operate in parallel to process partially overlapping subsets of the replayed network traffic stream. For example, the network security module 418 may be a network security monitor that receives a full copy of the UDP network traffic and a subset of the TCP network traffic, and the network security module 424 may be a deep packet inspection module receiving a full copy of the UDP traffic and no TCP traffic.

Although not shown, two or more of the network security modules may also operate in series (e.g., so that the output of a first network security module is fed into a second network security module).

Each of the network security modules 418, 424, 426, and 428 has access to a library of threat information (not shown) useful in identifying and investigating various different types of security threats. For example, each of the network security modules 418, 424, 426, and 428 has access to information detailing what different types of threats "look like", instructions on how to identify security threats of each threat type, information regarding what each threat type needs to complete an intended purpose, etc.

The library of threat information includes a number of "threat type definitions" each specifying one or more threat analysis conditions used to evaluate the potential existence of a threat of the associated threat type. A network security module identifies (e.g., flags) a potential threat when it determines that a predetermined number or combination of the threat analysis conditions are satisfied in association with an individual threat type definition. The network security module may determine a potential threat is an actual threat when, for example, the network security module confirms that another predefined subset of the threat analysis conditions are satisfied so as to guarantee the existence of the threat to within a threshold level of certainty.

Threat type definitions may assume a variety of forms. One example threat type definition is a "signature." Threat analysis conditions used in identifying the signature may include, for example, identification of one or more predetermined patterns or sequences within the replayed network traffic stream. In one implementation, a potential threat is flagged when a network security module identifies a first predetermined number of patterns or sequences included in a component stream matching patterns or sequences specified in association with a particular threat type definition. The existence of an actual threat is confirmed, for example, when a second predetermined number of such patterns and sequences are positively identified.

Another example threat type definition is a heuristic determination, such as a determination based on rules about patterns observed in the replayed network traffic stream. For example, a network security module investigating threats using a heuristic determination may look for progression across a number of different types of threat indicators that may be indicative of an increasingly successful compromise within an overall attack. For example, a network security module may look for progression within different states of a known type of attack.

Still another example threat type definition is an outcome of a behavioral model, such as a model that defines a baseline representing 'normal' network behavior. When a network security module implements a behavioral model, deviations from this baseline behavior are flagged as potential threats. For example, a threat definition may specify a 'normal' distribution of different types of traffic, such a distribution largely comprising HTTP and SSH traffic. If an amount of BitTorrent traffic suddenly increases in a manner inconsistent with the defined baseline, the BitTorrent traffic may be flagged as suspicious activity (e.g., a potential threat).

Using the threat type definitions and other available information for each threat type (e.g., contextual information), each of the network security modules 418, 424, 426, and 428 parses the associated received component stream (e.g., the component streams 430, 432, 434, and 436) to identify "potential threats." While potential threats are readily identifiable in each of the component streams, a network security module may not always be able to confirm the existence of an actual threat with the limited information available in the associated component stream. For example, the network security module 418 may determine that a potential threat exists responsive to observing a pattern in the component stream 430 that matches a pattern specified in a particular threat type definition. In some cases, confirming whether or not a potential threat is real entails a more comprehensive investigation of circumstances.

Responsive to identifying a potential threat of a particular threat type, a network security module assesses available information associated with the threat type to identify portions of the replayed network traffic stream that may be useful in confirming or disaffirming the existence of the threat. If the network security module determines that it is not currently receiving some information potentially useful in identifying a threat, the network security module can request receipt of such information.

For example, contextual information describing a particular threat type may indicate that signatures of the threat type are likely to appear in a particular type of network traffic, such as within UDP network traffic. If the network security module 418 is currently not receiving UDP traffic, the network security module 418 can request receipt of UDP traffic (e.g., via a request of the real-time UDP stream or via a request of UDP traffic from a previous time interval).

Each of the network security modules 418, 424, 426, and 428 are capable of bidirectional communication with any of the other network security modules and also with the ingest server 412 by way of a number of different information protocols, illustrated as a message bus 414. The message bus 414 represents a platform on which messages can be published by any of the network security modules 418, 424, 426, and 428. The network security modules 418, 424, 426, and 428 and the ingest server 412 may also subscribe to any of the messages published via to message bus 414.

Through the message bus 414, the various processing entities continuously send and receive information, thereby signaling to and from one another along either or both direct and indirect routes. Some or all of the "publishers" (e.g., processing entities publishing to the message bus 414) may not have knowledge of the "subscribers" (e.g., processing entities listening to the message bus 414) and/or knowledge of information available to those subscribers.

Responsive to receipt of a published message, a processing entity determines whether it has access to the information requested via the message. For example, the network security module 424 may determine whether or not the component stream 432 currently includes information requested in a message published to the message bus 414 by the network security module 426. Similarly, the ingest server 412 determines whether the replayed network traffic from the agent network currently includes the information requested via the message bus 414.

If an information request of the message bus 414 is received by a processing entity with access to the requested information, that processing entity may make the requested information available to the publisher (e.g., the entity requesting the information), such as by placing the requested information in a channel of the message bus 414. The publisher can then utilize the shattering logic 416 to access the information and/or parse the requested information to extract a specific subset. More specific examples of data shattering and dynamic rerouting are discussed with respect to FIGS. 5 and 6.

The network security modules 418, 424, 426, and 428 of the managed security service 402 are, in various implementations, capable of searching for security threats within one or more of: (1) the metadata of the replayed network traffic; (2) the payload (non-metadata portion) of the replayed network traffic; and (3) the output of other network security modules within the managed security service 402. If deemed useful to threat identification, a network security module may be able to request information in any of these three categories. For example, the network security module 424 may request receipt of all or a sub-portion of the component data stream 430 or of a calculated output from the network security module 418.

In one implementation, the shattering logic 416 includes computer-executable instructions that facilitates "filtering" to fulfill complex data requests from the network security modules. Using the shattering logic 416, any of the processing modules (e.g., the network security modules 418, 424, 426, or 428, the storage reconstruction module 440, and/or the ingest server 412) can specifically request and independently receive data from any of layers II-VII of the open systems interconnection (OSI) reference module (not shown). Higher level filtering (e.g., layers IV through VII) is facilitated, in part, via on-demand reassembling of data from the permanent storage 422. For example, a processing module can utilize the shattering logic 416 to request data at any level of granularity, such as traffic from a specific website (Facebook® or YouTube®), traffic of a specific file type (e.g., jpegs, mpegs, etc.), or traffic of a specific file type with a specific content in the file type (e.g., Malware)

For context, the following discussion provides further examples for filtering at each of layers II-VII of the OSI reference model. For instance, layer II of the OSI reference model is the data link layer. Layer II filtering may entail, for example, filtering based on a particular data link protocol associated with incoming data. In contrast, layer III filtering refers to filtering of the network layer (e.g., filtering based on a specific IP address). Further, layer IV filtering refers to filtering of the transport layer (e.g., filtering for UDP or TCP traffic); and Layer V filtering refers to filtering of the session layer (e.g., filtering based on the connection state of a particular session). Layer VI filtering, in contrast, refers to filtering of encrypted traffic; and layer VII filtering refers to filtering of the application layer (e.g., filtering for HTTP traffic, specific URLS, specific data formats). Since the OSI reference model is widely established, it is understood that filtering at each of the respective layers mentioned above may refer filtering of other layer components known in the art and not discussed herein.

Figure 5:
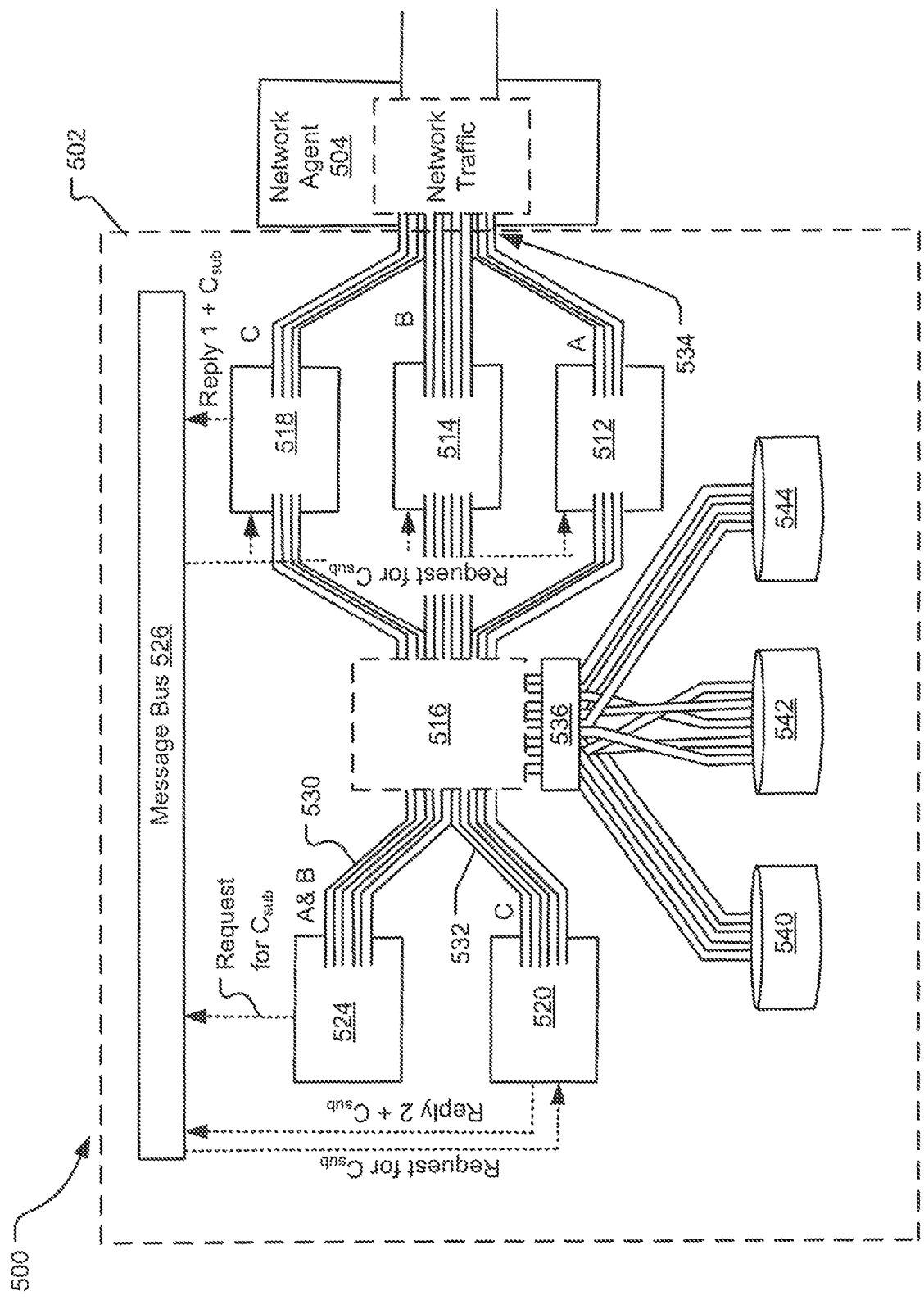
FIG. 5 illustrates another example network security system for detecting and analyzing security threats.

FIG. 5 illustrates an example network security system 500 for granular data shattering and on-demand reassembly from raw data storage for threat detection. The system includes a managed security service 502 that receives replayed network traffic from an agent 504 communicatively coupled to a respective enterprise network (not shown).

The managed security service 502 includes a number of ingest servers (e.g., ingest servers 512, 514, and 518) that each continuously receive and ingest a different portion (e.g., the portions A, B, and C) of a replayed network traffic stream 534 from the agent 504. In one implementation, each of the ingest servers 512, 514, and 528 ingests a different portion of the replayed network traffic stream. For example, the portions A, B, and C may be non-overlapping streams of data.

The ingest servers 512, 514, and 518 employ shattering logic 516 to recombine the different ingested data streams A, B, and C; shatter the recombined data into a number of outgoing component streams (e.g., component streams 530, 532); and direct each outgoing component stream to an associated network security module (e.g., network security modules 520 or 524). In addition, the ingest servers 512, 514, and 518 use the shattering logic 516 to distribute a copy of the raw ingested network traffic to a variety of storage facilities 540, 542, and 544.

A storage reconstruction module 536 works in conjunction with the shattering logic 516 to provide for on-demand assembly of any data (e.g., fragmented raw data) stored in the storage facilities 540, 542, and 544. In one implementation, on-demand assembly is performed on a high level (e.g., layer VII of the OSI model) to accommodate a very specific (e.g., granular) data request, such as a request for data from a particular source, of a particular file type, or a data file type including some specified content.

The content of the component streams 530 and 532 are selected via the shattering logic 516 based on the type of information that is currently requested and used by each of the network security modules 520 and 524. In FIG. 5, the network security module 524 receives a first subset of the ingested data (e.g., the portions A and B), and the network security module 520 receives a second, non-overlapping subset of the ingested data (e.g., the portion C).

Each of the network security modules 520 or 524 has access to a list of threat type definitions, each specifying one or more threat analysis conditions used to evaluate the potential existence of a threat of the associated threat type. Each of the network security modules 520 and 524 parses the associated received component stream (e.g., the component streams 530 and 532, respectively) to identify "potential threats." If a potential threat is identified, the network security module launches an investigation to verify whether or not the potential threat is real.

In the example of FIG. 5, the network security module 524 identifies a potential threat in the received component stream 530. For example, the network security module 524 may identify a pattern that matches a pattern included in a particular threat type definition. In response, the network security module 524 accesses contextual information associated with the threat type definition. The contextual information indicates that the potential threat is more likely to be real if a particular sequence of data appears in a portion of interest $C_{sub}$ within the portion C of data in the network traffic stream. For example, the portion C may include all http traffic, and the sub-portion of interest $C_{sub}$ may include domains extracted from HTTP requests.

In an alternate example, the network security module 524 identifies an automatically generated domain (e.g., 4e986ac86fdf7b36c94bcdf32bee.com) as a potential security threat within the component data stream 530. Available contextual information indicates that the domain is more likely to be an actual security threat if the domain was generated in the last 15 minutes. Therefore, the network security module 524 determines that it needs to assess timestamp information relating to creation of the domain. The network security module 524 further determines that the timestamp information is included in a portion of interest $C_{sub}$.

After determining that the portion of interest $C_{sub}$ is relevant to investigating a particular threat identified in the component stream 530, the network security module 524 assesses whether or not it is currently receiving the portion of interest $C_{sub}$. If it is not currently receiving the portion of interest $C_{sub}$ (as in the illustrated example), the network security module 524 transmits a message, also referred to as a "delivery request" to a message bus 526 to request the data portion of interest $C_{sub}$.

The delivery request is communicated to one or more processing entities 'listening' to the message bus 526, such as via subscription(s) to one or more channels. For example, any combination of the ingest servers 512, 514, and 518, the storage reconstruction module 536, and/or the network security module 520 may receive the message via one or more different communication protocols (e.g., some messages may go to all processing entities; other messages go to specific or a select few of the processing entities).

In one implementation, one or more processing entities receive the delivery request by independently publishing messages to a queue of the message bus 526 and asynchronously pulling messages off of the queue. Other processing entities may receive the message through a direct coupling permitting a common communication protocol with the requesting entity (e.g., the network security module 524).

In the illustrated example, the ingest servers 512 and 514 each determine that they are not currently receiving the requested portion of interest $C_{sub}$. However, the ingest server 518 determines that it is currently receiving the requested portion of interest $C_{sub}$ within its received portion "C." The ingest server 518 sends a message (e.g., "Reply 1" in FIG. 5) back to the message bus 526 indicating that the ingest server 518 has access to the requested information and/or information indicating where the requested data ($C_{sub}$) is physically being received. The outgoing message "Reply 1" may, for example, include a descriptor indicating types of available traffic. In addition, the ingest server 518 places a copy of the requested data ($C_{sub}$) into a channel of the message bus 526 for immediate or subsequent pickup and re-direction to the requesting entity (e.g., the network security module 524).

In some situations, data placed in a message bus channel responsive to a delivery request may include more data than that specified by the request. For example, the ingest server 518 may make all data of the portion "C" available for pickup via the channel of the message bus 526, even though the request specifies the sub-portion of interest $C_{sub}$. To retrieve the specifically requested subset $C_{sub}$, the requesting entity employs the shattering logic 516 to parse and/or filter and to redirect the available data in the channel. For example, the network security module 524 uses the shattering logic 516 to parse through the portion "C" and grab only the requested subset (e.g., $C_{sub}$) from the channel.

In various implementations, data placed in the channel of the message bus 526 includes raw network traffic and/or metadata (e.g., from the storage facilities 540, 542, and/or 544). Examples of metadata include without limitation network conversation statistics such as IP addresses, bytes transferred, applications/protocols, etc.

Returning to the example of FIG. 5, the network security module 520 also determines that it is currently receiving the data portion C including the requested portion of interest $C_{sub}$. Accordingly, the network security module 520 also sends a message (e.g., "Reply 2" in FIG. 5) back to the message bus 526 indicating that that the network security module 520 has access to the requested information and/or information indicating where the requested data $C_{sub}$ is physically being received.

In one implementation, the network security module 520 determines that the requested data $C_{sub}$ is already in a channel of the message bus 526 (e.g., if already placed there by the ingest server 518), and the network security module 520 takes no further action. In another implementation, the network security module 520 places a redundant copy of the requested data in a channel of the message bus 526 for immediate or subsequent pick-up by the requesting entity (e.g., the network security module 524).

In some situations, a network security module may request a permanent change to the constituents included in the associated, received component stream. For example, the network security module 524 may request that it permanently begin receiving all ingested $C_{sub}$ data based on a recently identified and newly defined threat. In this case, the network security module 524 employs the shattering logic 516 to alter the constituents of the component stream 530, such as by creating a duplicate copy of the $C_{sub}$ traffic from the ingest server 518 and aggregating the copy into the component stream 530.

In yet another implementation, the network security module 520 transmits a request to the message bus 526 for specific data that is in a raw data storage repository at the storage facility 542. The storage reconstruction module 536 receives the message by listening to the message bus 526 and utilizes the shattering logic 516 to perform an on-demand assembly of the requested data from fragmented data components in the raw data storage repository.

Figure 6:
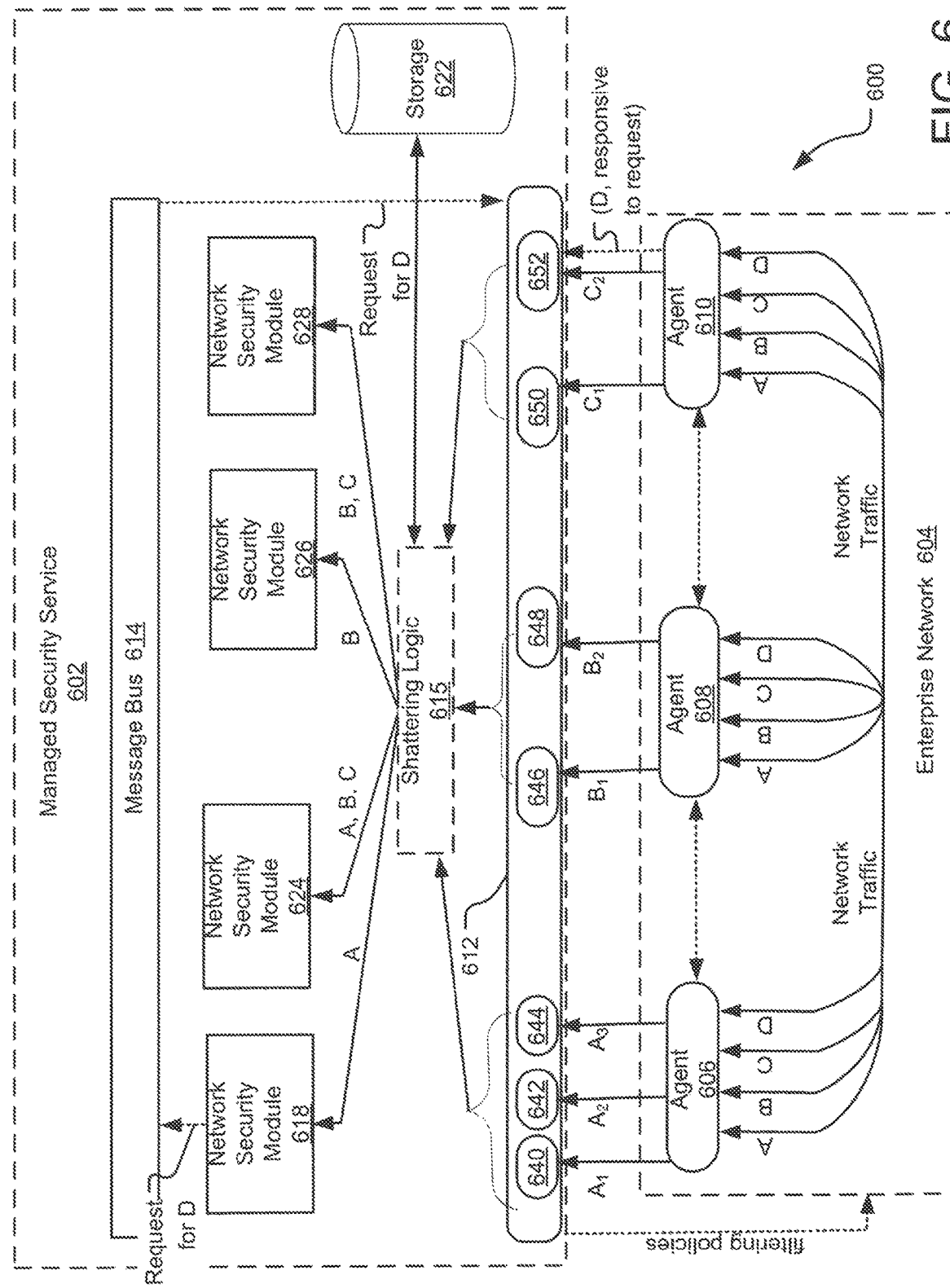
FIG. 6 illustrates yet another example network security system for detecting and analyzing security threats.

FIG. 6 illustrates an example network security system 600 that provides for dynamic alteration of data ingest requests to detect and analyze security threats. The network security system 600 includes a managed security service 602 that receives replayed network traffic from a number of agents (e.g., agents 606, 608, and 610) each residing locally at a point of egress in an enterprise network 604.

The network agents 606, 608, and 610 each have access to network data packets sent to and from various communications devices on the enterprise network 604. Each of the network agents 606, 608, and 610 may have a filtering module, copying module, and a transmission processing module (e.g., as described with respect to FIG. 2). According to one implementation, the agents 606, 608, 610 are capable of filtering with a granularity on the order of any of levels II-VII of the OSI model. In one implementation, filtering policies of the agents are specified by a processing entity external to the enterprise network 604. For example, the filtering policies of the agents 606, 608, and 610 are managed and dynamically controlled (e.g., altered) by a communicatively coupled array of ingest servers 612 within the managed security service 602.

In FIG. 6, each of the ingest servers in the ingest server array 612 communicates an identical set of filtering policies to the corresponding agent 606, 608, and 610. For example, the agents 606, 608, and 610 may each receive filtering policies requesting replay of network traffic data portions A, B, and C, but excluding a portion D. Any agents located in alternate enterprise networks (not shown) may be subject to different filtering policies than those implemented in the enterprise network 604.

The agents 606, 608, and 610 communicate with one another to divide up transmission processing and replay tasks specified via the filtering policies. In the illustrated example, the agent 606 assumes the task of replaying the data portion A; the agent 608 assumes the task of replaying the data portion B; and the agent 610 assumes the task of replaying the data portion C. The agents 606, 608, and 610 each elect to divide their associated traffic portion (e.g., the portions A B or C) to two or more different ingest servers in the array 612. In one implementation, each agent (e.g., the agents 606, 608, and 610) selects associated ingest servers of the array 612 based on instructions embedded in firmware. In other implementations, the agents 606, 608, and 610 are able to dynamically redirect traffic between the various ingest servers, such as to adjust and rebalance for fluctuations in work load or the availability or services in the cloud.

In the example of FIG. 6, the agent 606 splits the data portion A into three component streams A1, A2, and A3 directed to ingest servers 640, 642, and 644, respectively. Similarly, the agent 608 splits the data portion B into two component streams B1 and B2, directed to ingest servers 646 and 648, respectively, and the agent 610 splits the data portion C into two component streams C1 and C2 directed to ingest servers 650 and 652, respectively.

The ingest server array 612 utilizes the shattering logic 616 to continuously route, in real-time, the ingested replayed network traffic to various destinations as requested by a plurality of network security modules 618, 624, 626, or 628. The shattering logic 616 allows the ingest server array 612 to recombine the incoming components streams, shatter the recombined stream into a number of outgoing component streams, and route each of the outgoing component streams to a corresponding one of a plurality of network security modules 618, 624, 626, or 628. In one implementation, the shattering module 616 also directs a copy of the raw, ingested network traffic to a permanent storage location in storage 622.

The ingest server array 612 uses the shattering logic 616 determine how to shatter (e.g., filter and/or duplicate) the ingested network traffic into different component streams based on the type of information that is currently requested and used by each of a number of the network security modules (e.g., network security modules 618, 624, 626, and 628). One component stream including the data portion A is directed to the network security module 618; another component stream including a full copy of the replayed network traffic (the data portions A, B, and C) is directed to the network security module 624; another component stream including the data portion B is directed to the network security module 626; and yet another component stream including the data portions B and C is directed to the network security module 628.

Each of the network security modules 618, 624, 626, and 628 has access to a threat information library including threat type definitions and contextual information associated with each threat type definition. When a new type of threat is discovered anywhere on the managed security service 602, the list of threat type definitions is appended to include the new threat and any available information associated with the threat is added to the library. For example, the managed security service 602 may discover a new type of threat while processing network traffic of another enterprise network that is also subscribed to the managed security service 602 (e.g., network traffic of other enterprise networks 224, as shown in FIG. 2). Consequently, the newly-discovered threat type is made available for threat analysis of the replayed network traffic of the enterprise network 604. In this sense, threat-related knowledge gained via analysis of data from one enterprise network informs the threat detection capability of the network security system 600 within the enterprise network 604.

Each of the network security modules 618, 624, 626, and 628 parses the associated received component stream to identify "potential threats" using the threat information library. Responsive to positively identifying a potential threat, a network security module may launch an investigation to determine whether or not the potential threat is an actual threat.

In the example of FIG. 6, the network security module 618 discovers a potential security threat of a newly-discovered threat type in the data portion A of its received component stream. Other available threat information indicates that a data portion D of the original network traffic stream may be useful in investigating the new threat type. Responsive to a determination that the data portion D is not currently being received by the network security module 618, the network security module 618 publishes a delivery request to a message bus 614 requesting receipt of the data portion D. The delivery request is received by any processing entities subscribed to messages of the message bus 614 of an associated protocol. The ingest server array 612 recognizes that the requested data portion D is not currently being received by any of its associated ingest servers and, responsive to such determination, uses the shattering logic 614 to revise the currently-implemented filtering policies to include a request for the data portion D. The revised filtering policies are communicated to each of the agents 606, 608, and 610.

Responsive to receipt of the revised filtering polices, the agents 606, 608, and 610 communicate with one another to delegate the task of replaying the data portion D to the managed security service 602. Such delegation may be based on a number of factors including, for example, available bandwidth and replay capability of each of the network agents 606, 608, and 610. The agent 610 is delegated the task of replaying the data portion D and begins to include the data portion D in replayed data stream directed to the ingest server 652.

Figure 7:
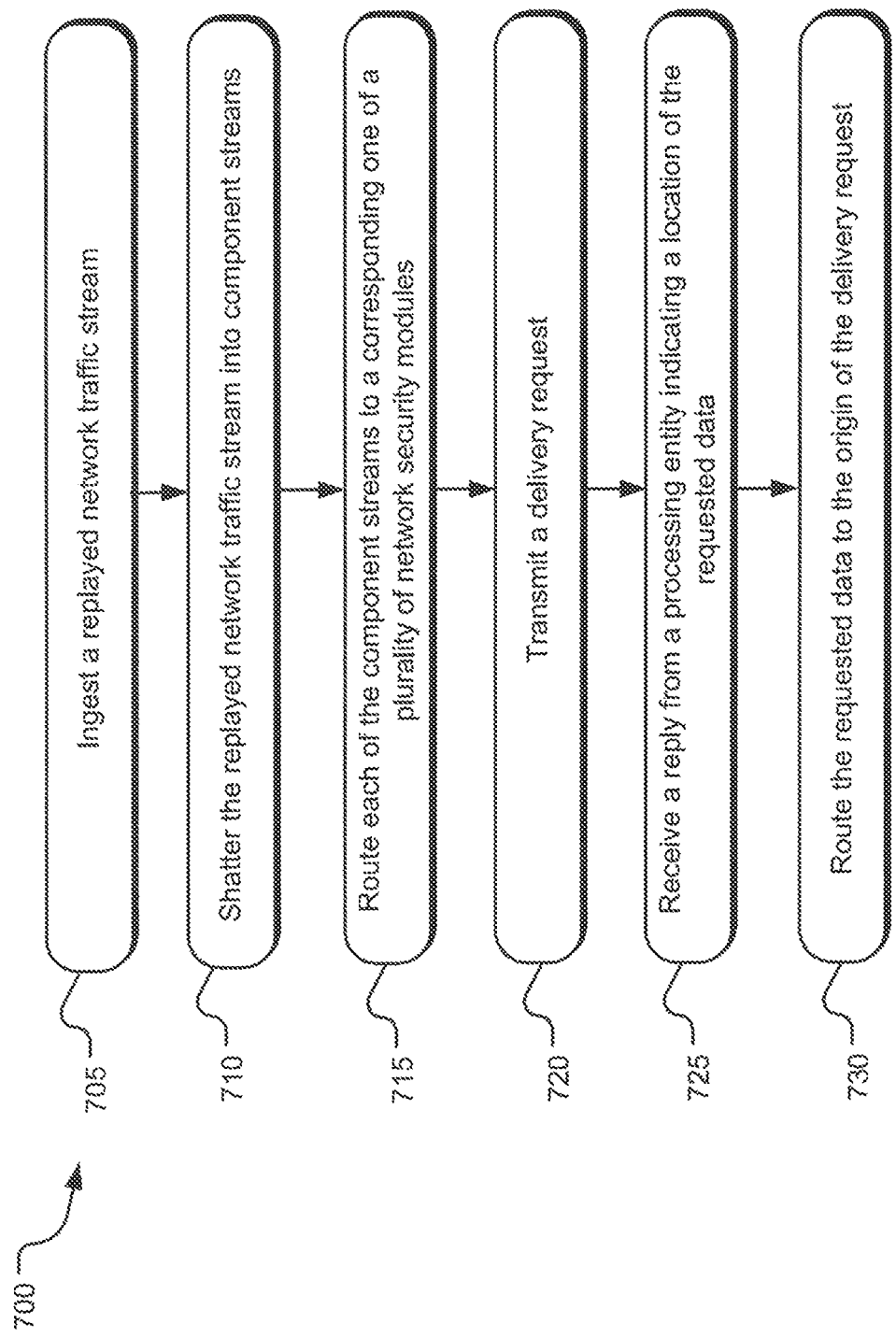
FIG. 7 illustrates example operations performed by various entities of a managed security service to identify security threats in an enterprise network.

FIG. 7 illustrates example operations 700 performed by various entities of a managed security service to identify security threats in an enterprise network. An ingest operation 705 ingests a replayed network traffic stream of an enterprise network. In one implementation, the replayed network traffic stream is a subset of an original network traffic stream. The original network traffic stream is copied and filtered according to one or more filtering policies before it is transmitted (e.g., replayed) outside of the enterprise network and to the managed security service tasked with processing the network traffic to identify and analyze security threats.

A shattering operation 710 shatters the replayed network traffic stream into a number of component streams. In various implementations, shattering entails filtering and/or duplicating data of the replayed network traffic stream. The resulting component streams may be completely distinct data sets, partially overlapping data sets, or identical data sets.

A routing operation 715 routes each of the generated component streams to a corresponding one of a plurality of network security modules in the managed security service. Each of the network security modules processes the associated received component data stream to search for potential security threats. When a network security module discovers a potential security threat of a given threat type, the network security module accesses contextual information associated with the threat type (e.g., what the threat needs, what the threat looks like, where the threat can be found) to determine whether or not to request an additional data portion of the original replayed network traffic stream.

To request the additional data portion, a transmission operation 720 transmits a delivery request to one or more other communicatively coupled processing modules of the managed security service. In one implementation, the delivery request describes additional information that is requested and a location of the requesting entity.

A receiving operation 725 receives a reply from another processing entity indicating a location of the requested information. With this information, a routing operation 730 using shattering logic to route the requested information to the requesting entity. For example, the routing operation 730 may generate a duplicate copy of the requested data from a current destination and route the duplicate copy to the requesting entity. Alternatively, the routing operation 730 may re-direct the requested information from away from its current path and to the requesting entity.

FIG. 8 discloses a block diagram of a computer system 800 suitable for implementing one or more aspects of a security system that provides for network traffic replay outside of an enterprise network. The computer system 800 is capable of executing a computer program product embodied in a tangible computer-readable storage medium to execute a computer process. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Data and program files may be input to the computer system 800, which reads the files and executes the programs therein using one or more processors. Some of the elements of a computer system 800 are shown in FIG. 8 wherein a processor 802 is shown having an input/output (I/O) section 804, a Central Processing Unit (CPU) 806, and a memory section 808. There may be one or more processors 802, such that the processor 802 of the computing system 800 comprises a single central-processing unit 806, or a plurality of processing units. The processors may be single core or multi-core processors. The computing system 800 may be a conventional computer, a distributed computer, or any other type of computer. The described technology is optionally implemented in software loaded in memory 808, a disc storage unit 812, and/or communicated via a wired or wireless network link 814 on a carrier signal (e.g., Ethernet, 3G wireless, 4G wireless, LTE (Long Term Evolution)) thereby transforming the computing system 800 in FIG. 8 to a special purpose machine for implementing the described operations.

The I/O section 804 may be connected to one or more user-interface devices (e.g., a keyboard, a touch-screen display unit 818, etc.) or a disc storage unit 812. Computer program products containing mechanisms to effectuate the systems and methods in accordance with the described technology may reside in the memory section 804 or on the storage unit 812 of such a system 800.

A communication interface 824 is capable of connecting the computer system 800 to an enterprise network via the network link 814, through which the computer system can receive instructions and data embodied in a carrier wave. When used in a local area networking (LAN) environment, the computing system 800 is connected (by wired connection or wirelessly) to a local network through the communication interface 824, which is one type of communications device. When used in a wide-area-networking (WAN) environment, the computing system 800 typically includes a modem, a network adapter, or any other type of communications device for establishing communications over the wide area network. In a networked environment, program modules depicted relative to the computing system 800 or portions thereof, may be stored in a remote memory storage device. It is appreciated that the network connections shown are examples of communications devices for and other means of establishing a communications link between the computers may be used.

In an example implementation, a network agent of an enterprise network or processing entity of the managed security service (e.g., a shattering module, network security module(s), ingest server(s), etc.) is embodied by instructions stored in memory 808 and/or the disc storage unit 812 and executed by the processor 802. Further, local computing systems, remote data sources and/or services, and other associated logic represent firmware, hardware, and/or software, which may be configured to replay network traffic outside of the enterprise network and/or process replayed network traffic to identify and investigate security threats. The network agent(s) of the enterprise network or processing entities of the managed security service may be implemented using a general purpose computer and specialized software (such as a server executing service software), a special purpose computing system and specialized software (such as a mobile device or network appliance executing service software), or other computing configurations. In addition, data-selection policies and data transmission preparation policies may be stored in the memory 808 and/or the disc storage unit 812 and executed by the processor 802.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. One or more tangible computer-readable storage media encoding computer-executable instructions for executing a computer process that facilitates shattering and dynamic redirection of network traffic for threat investigation, wherein the computer-readable storage media is not a carrier wave or propagating signal and the computer process further comprises:
receiving, at a first processing module, a subset of a network traffic stream;
identifying a potential security threat in the subset received at the first processing module;
based on the identification of the potential security threat, identifying a requested portion of the network traffic stream that includes information for investigating the potential security threat, wherein the requested portion is not currently included in the subset of the network traffic stream received at the first processing module;
communicating a delivery request to a plurality of other processing modules, each of the other processing modules simultaneously receiving and processing data of the network traffic stream, wherein the delivery request defines the requested portion of the network traffic stream;
responsive to the delivery request, routing the requested portion of the network traffic stream to the first processing module; and
processing the requested portion upon receipt at the first processing module to determine whether the potential threat identified in the subset of the network traffic stream is an actual threat.

2. The one or more computer-readable storage media of claim 1, wherein routing the requesting portion of the replayed network stream further comprises reassembling the requested portion from a raw data storage repository.

3. The one or more computer-readable storage media of claim 1, wherein the first processing module and at least one of the other processing modules process different subsets of the network traffic stream in parallel with one another.

4. The one or more computer-readable storage media of claim 1, wherein the first processing module and at least one of the other processing modules process partially-overlapping subsets of the network traffic stream.

5. The one or more computer-readable storage media of claim 1, wherein the network traffic stream is generated by filtering an original network traffic stream according to a filtering policy of an ingest server and replaying the filtered network traffic stream outside of an enterprise network.

6. The one or more computer-readable storage media of claim 5, further comprising:
altering the filtering policy responsive to publication of the delivery request.

7. The one or more computer-readable storage media of claim 1, wherein the delivery request is a request for specific data defined by layer VII of the open systems interconnection (OSI) model.

8. The one or more computer-readable storage media of claim 1, further comprising:
receiving, at the first processing module, information defining a new threat type discovered exclusively outside of an enterprise network supplying the network traffic stream.

9. The one or more computer-readable storage media of claim 8, wherein the potential security threat is of the new threat type.

10. The one or more computer-readable storage media of claim 1, wherein the requested portion of the network traffic stream includes information identified as important in investigating the potential security threat.

11. A threat analysis and detection system comprising:
memory;
a processor;
a first processing module stored in the memory and executable by the processor configured to:
identify a potential security threat in a received subset of a network traffic stream;
responsive to the identification, identify a requested portion of the network traffic stream that includes information for investigating the potential security threat, wherein the requested portion is not currently included in the received subset of the network traffic stream; and
communicate a delivery request to a plurality of other processing modules of a managed security service, the delivery request specifying the requested portion of the network traffic stream; and
a second processing module stored in the memory that responds to the delivery request with a confirmation of current receipt of the requested portion of the network traffic stream; and
shattering logic including instructions for routing the requested portion of the network traffic stream to the first processing module responsive to the confirmation from the second processing module, wherein the first processing module is further configured to process the requested portion upon receipt to determine whether the potential threat identified in the subset of the network traffic stream is an actual threat.

12. The threat analysis and detection system of claim 11 further comprising:
wherein the potential security threat is of the new threat type discovered exclusively outside of an enterprise network supplying the network traffic stream.

13. The system of claim 11, wherein the first processing module employs the shattering logic to reassemble the requested portion from a raw data storage repository.

14. The system of claim 11, wherein the first processing module and the second processing module process different subsets of the network traffic stream in parallel with one another.

15. The system of claim 11, wherein the first processing module and the second processing module process partially-overlapping subsets of the network traffic stream.

16. The system of claim 11, wherein the network traffic stream is generated by filtering an original network traffic stream according to a filtering policy and exporting the filtered network traffic stream outside of an enterprise network.

17. The system of claim 11, further comprising:
altering the filtering policy responsive to receipt of the delivery request at an ingest server.

18. The system of claim 11, wherein the delivery request is a request for specific data defined by layer VII of the open systems interconnection (OSI) model and the first processing module employs the shattering logic to reassemble the requested portion from a raw data storage repository.

19. A method comprising:
receiving, at a first processing module, a subset of a network traffic stream;
identifying a potential security threat in the subset received at the first processing module;
based on the identification of the potential security threat, identifying a requested portion of the network traffic stream that includes information for investigating the potential security threat, wherein the requested portion is not currently included in the subset of the network traffic stream received at the first processing module;

communicating a delivery request to a plurality of other processing modules, each of the other processing modules simultaneously receiving and processing data of the network traffic stream, wherein the delivery request defines the requested portion of the network traffic stream;

responsive to the delivery request, routing the requested portion of the network traffic stream to the first processing module; and processing the requested portion upon receipt at the first processing module to determine whether the potential threat identified in the subset of the network traffic stream is an actual threat.

20. The method of claim 19, wherein routing the requesting portion of the replayed network stream further comprises reassembling the requested portion from a raw data storage repository.

* * * * *